United States Patent [19]
Nakano

[11] Patent Number: 5,754,898
[45] Date of Patent: May 19, 1998

[54] CONTROL DEVICE FOR A CAMERA CAPABLE OF USING A FLASH DEVICE

[75] Inventor: Yoshiyuki Nakano, Tokyo, Japan

[73] Assignee: Nikon Corporation, Tokyo, Japan

[21] Appl. No.: 939,920

[22] Filed: Sep. 29, 1997

Related U.S. Application Data

[63] Continuation of Ser. No. 610,245, Mar. 4, 1996, abandoned.

[30] Foreign Application Priority Data

Mar. 10, 1995  [JP]  Japan ................................. 7-050906

[51] Int. Cl.⁶ ............................................ G03B 15/05
[52] U.S. Cl. ............................................ 396/180
[58] Field of Search .................... 354/420, 422, 354/456, 233, 236; 396/61, 180, 195, 249, 452, 456, 459, 461, 462

[56] References Cited

U.S. PATENT DOCUMENTS 3,812,512  5/1974  Shimuzu et al. ................. 354/258
4,054,890  10/1977  Shimomura ..................... 354/227
4,929,977  5/1990  Ishikawa et al. ................. 354/420

Primary Examiner—Daniel P. Malley

[57] ABSTRACT

A camera has first and second openable/closable shutters disposed in side-by-side relationship with the same photographing optical path and can be attached with a flash device. The camera includes a first photographing portion for exposing a film with light by operating a first shutter in an opened state of a second shutter and a second photographing portion for exposing the film with the light by operating the second shutter in the opened state of the first shutter. The camera also includes a control circuit for selecting one of the first and second photographing portions and a flash control circuit for controlling the flash device when effecting flash photographing. The flash control circuit controls the flash device synchronizing with the film exposure corresponding to the selected photographing portion.

5 Claims, 3 Drawing Sheets

CONTROL DEVICE FOR A CAMERA CAPABLE OF USING A FLASH DEVICE

This application is a continuation of application Ser. No. 08/610,245, filed Mar. 4, 1996, now abandoned.

BACKGROUND OF THE INVENTION

1. Field of the Invention

The present invention relates generally to a camera having first and second shutters on the same photographing optical path and capable of flash photographing by a flash device and more particularly to a control device used for controlling flashing by a flash device when performing the flash photographing by employing the flash device in combination with the first or second shutter in such a camera.

2. Related Background Art

One type of a conventional camera having first and second shutters has such a construction that two sets of shutters are disposed on the same photographing optical path, and a film surface is exposed to the light by selectively opening and closing these shutters. More specifically, this construction is obtained by mounting an interchangeable lens with a lens shutter on a camera having a focal plane shutter.

When this kind of camera is equipped with a flash device such as a flashbulb and an electronic flash for flash photographing, the flash device has hitherto been generally connected to one of synchro terminals provided in the above two sets of shutters.

Further, another type of known camera exploits an electro-optical effect, wherein a so-called physical property shutter is disposed overlapping with a conventional mechanical shutter on the photographing optical path and thus made usable.

Accordingly, in the above-mentioned prior art camera, even when performing the flash photographing corresponding to a variety of photographing conditions by combining the two sets of shutters with the flash device in a desired state and making use of these portions, it is impossible to effect the flash photography synchronizing with the opening/closing operations of the respective shutters. It is therefore desired that some measures capable of obviating such drawbacks be taken.

For example, in the conventional example of the former type described herein above, the camera is so set that the focal plane shutter is first opened, and next where an actual exposure takes place by employing the lens shutter. Nevertheless, if the flash device is connected to the synchro terminal on the side of the focal plane shutter, flashing occurs synchronizing with the opening of the focal plane shutter. As a result, the opening of the lens shutter does not synchronize exactly with the flashing of the flash device, resulting in a failure of the flash photographing.

On the other hand, when the camera is set in a state where the photographing is performed by use of only the focal plane shutter while the lens shutter remains open, and if the flash device is connected to the synchro terminal of the lens shutter, the flash device never flashes. The flash photographing also results in the failure.

Moreover, it can be also considered that the synchro terminals of these two shutters are selectively used corresponding to a shutter speed and connected to the flash device. There arises, however, a problem in terms of an operability thereof because of requiring much labor for switching the connection therebetween.

That is, the camera incorporating the two sets of shutters described herein above may be constructed so that the flash photographing at a shutter speed on the order of 1/500 through 1/60 sec. is effected by use of the lens shutter, and the flash photographing at 1/30 through 1 sec. is performed by the focal plane shutter. If the flash photographing in the vicinity of 1/30 to 1/60 sec. is carried out by using alternately the lens shutter and the focal plane shutter, however, the connection to the synchro terminal is required to change each time. The problem in terms of the operability is caused.

Further, in the conventional example of the latter type described herein above, there is no specific proposal about how the two sets of shutters are connected to the flash device and how to synchronize the flash device with each of the shutters to fire the flash. In particular, the physical property shutter has no portion for outputting a synchronous signal for using the flash device in combination, with the result that flash photographing can not be done with simplicity. Accordingly, such a camera can not be expected to perform the flash photographing synchronized with the respective shutters even by selectively using the two sets of shutters and this leads to increases in frequency of failure of flash photographing.

Further, e.g., the lens shutter among those used for the cameras is capable of effectively exploiting the light if a maximum light output of the flash device coincides with a timing when the shutter is fully opened. On the other hand, in the case of a slit shutter such as the focal plane shutter, the shutter is fully opened, during which the flash device flashes. Alternatively, the flash device flashes for a relatively long period of time, and the shutter is tripped for a duration of effective flashing thereof, thus finishing the photography.

Accordingly, in the camera having the two sets of shutters, when the flash photographing is performed by the flash device, it is required that the control be conducted to synchronize a flashing timing of the flash device with an opening/closing time of the shutter in accordance with each individual condition, depending on a characteristic of each shutter. It is desired that some measures capable of obviating the above-mentioned problems be taken in consideration of the above points.

SUMMARY OF THE INVENTION

It is a primary object of the present invention, which was contrived under such circumstances, to provide a control device for a camera capable of flash photographing, wherein a flash device is temporarily connected to a connected portion such as an accessory shoe and a synchro terminal of a camera when performing flash photographing in accordance with an operation mode based on a combination of first and second shutters disposed on the same photographing optical path, and the flash photographing automatically synchronized with an opening/closing operation of the shutter on an exposure side is performed with neither a mistake nor much labor.

It is another object of the present invention to provide a control device for a camera capable of flash photographing, wherein the operation mode based on the combination of the first and second shutters can be automatically selected corresponding to a shutter speed set according to a set value of a manual shutter dial as well as by an output of an auto-exposure control device serving as a shutter speed setting portion, and flash photographing can be thereby conducted more easily.

In response to such demands, according to the present invention, there is provided a control device for a camera capable of using a flash device and provided with a first shutter for selectively guiding a light flux from an object onto a film surface via a photographic lens and a second shutter for selectively guiding the light flux passing through the first shutter onto the film surface. The control device comprises a first photographing portion for exposing the film surface to the light flux by making the first shutter transmit the light in a state where the second shutter is opened. The control device also comprises a second photographing portion for exposing the film surface to the light flux by making the second shutter transmit the light in a state where the first shutter is opened. The control device further comprises a control circuit for selecting and operating one of the first photographing portion and the second photographing portion, and a flash control circuit for controlling the flash device when performing flash photographing, wherein the flash control circuit controls the flash device in synchronization with the first shutter when the first photographing portion is selected and controls the flash device in synchronization with the second shutter when the second photographing portion is selected.

Further, the control device for the camera capable of the flash photographing further comprises a shutter speed setting device for setting a shutter speed. The control circuit selects the first photographing portion and the second photographing portion in accordance with the shutter speed set by the shutter speed setting device.

Herein, the control device for the camera capable of flash photographing according to the present invention is constructed so that the first shutter is disposed either between lens elements constituting the photographic lens or in the vicinity of a rear portion of the photographic lens, and the second shutter is disposed in the vicinity of a front portion of the film surface. The same control device is constructed so that the control circuit selects the first photographing portion when the shutter speed setting portion sets a shutter speed higher than a predetermined shutter speed and the second photographing portion when the shutter speed setting portion sets a shutter speed lower than the predetermined shutter speed.

According to the present invention, when the flash device performs flash photographing in synchronization with the operation of the first or second shutter for opening and closing the same photographing optical path, the control circuit selects one of the first photographing portion for performing photographing while making the first shutter transmit the light in the state where the second shutter is opened and the second photographing portion for performing photographing while making the second shutter transmit the light in the state where the first shutter is opened. The flash control circuit controls the flash device by synchronizing with the first shutter when selecting the first photographing portion and synchronizing with the second shutter when selecting the second photographing portion. It is thus possible to execute flash photographing in accordance with the shutter operation of substantially performing the exposure.

That is, according to the present invention, the control circuit automatically controls and switches over the operation of exposing the film by operating the first shutter while the first photographing portion sets the second shutter in the state where the second shutter remains open longer than a period required for opening and closing the first shutter, including this period of time, and also the operation of exposing the film by operating the second shutter while the second photographing portion sets the first shutter in the state where the first shutter remains open longer than the period required for opening and closing the second shutter, including this period of time. Also, the flash control circuit controls the flash of the flash device in synchronization with the shutter controlled for the exposure by the selected photographing portion, thus performing the flash photographing.

Further, according to the present invention, the control circuit automatically selects the first or second photographing portion in accordance with the shutter speed set by the shutter speed setting device through an automatic output of the auto-exposure control device or manual setting of the manual shutter dial. The flash control circuit controls the flash device in synchronization with the operation of the shutter corresponding to the selected photographing portion. The flash photographing corresponding to the shutter operation can be thereby performed.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Preferred embodiments of the present invention will hereinafter be discussed with reference to the accompanying drawings.

Figure 1:
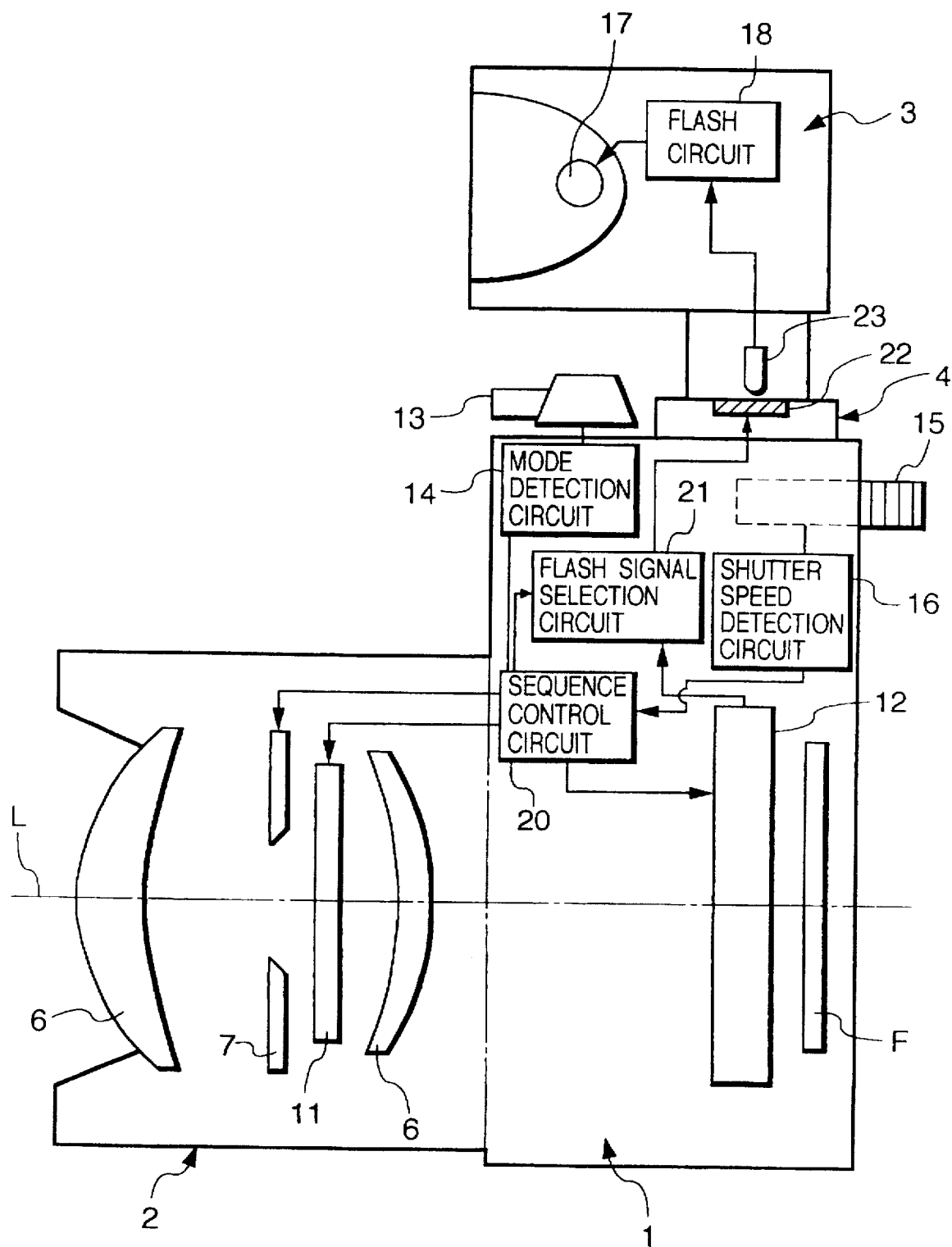
FIG. 1 is a view of a configuration of a whole camera, illustrating one embodiment of a control device for a camera capable of flash photographing according to the present invention.
Figure 2:
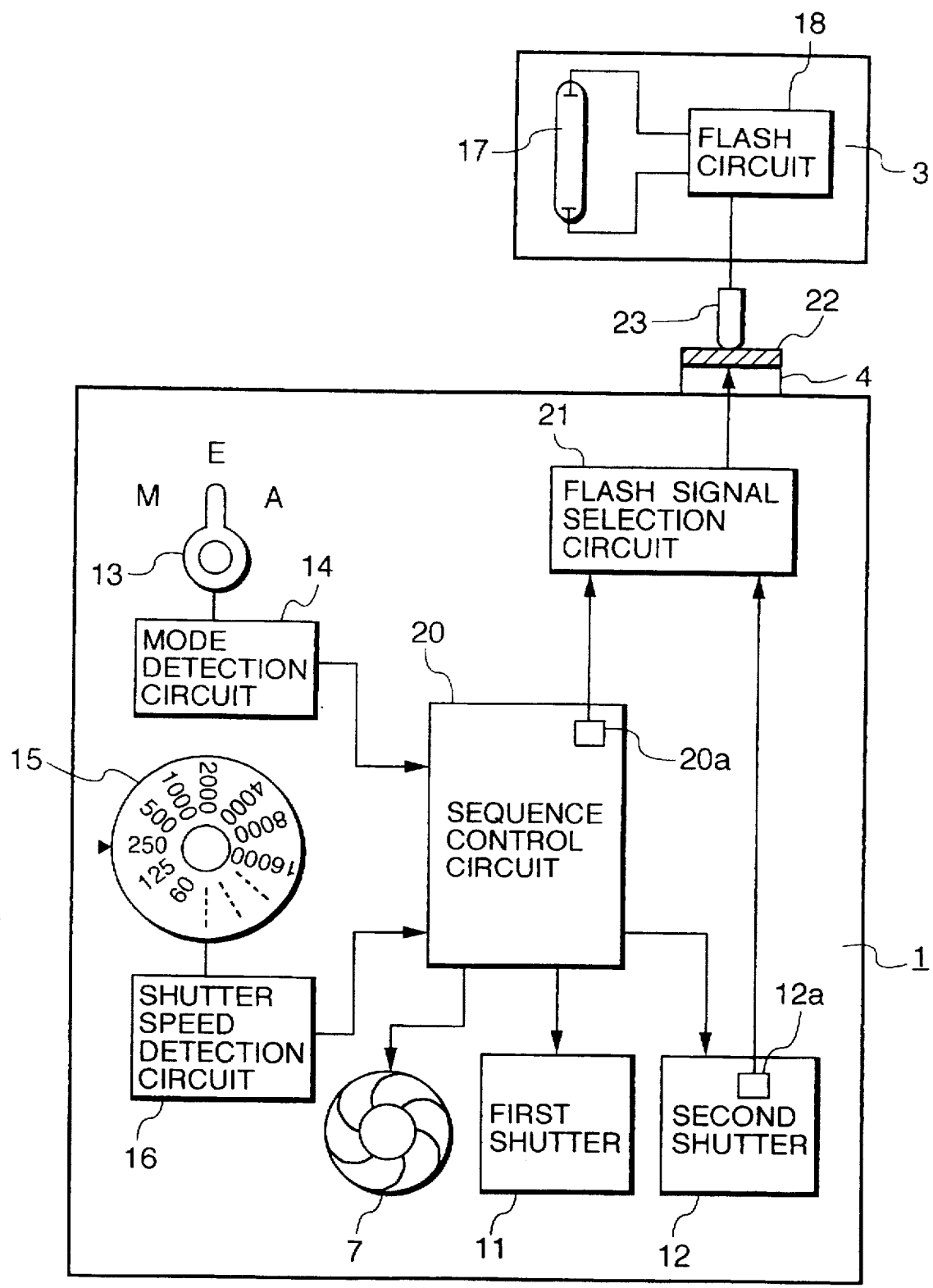
FIG. 2 is a circuit block diagram of the whole camera in the embodiment shown in FIG. 1.

FIGS. 1 and 2 illustrate one embodiment of a control device for a camera capable of flash photographing according to the present invention. In these Figures, an outline of construction of the whole camera is hereinbelow described with reference to FIG. 1.

Designated at 1 in the Figure is a camera body. The numeral 2 is a lens barrel protruded from the center of the front surface of the camera body 1, and 3 is a flash device using an electronic flash detachably attached to an accessory shoe 4 provided at the center of an upper edge of the camera body 1. Note that the lens barrel 2 may be of an interchangeable type of being detachably attached to the camera body 1 or of an integral type of being provided integrally therewith. Further, the flash device 3 may be likewise of the attachable/detachable type or the integral type.

The numeral 6 represents a photographic lens, disposed within the lens barrel 2, for forming a photographing optical path along an optical axis L. A stop diaphragm 7 and a lens shutter 11 are disposed within lens units constituting the photographic lens 6 in the lens barrel 2. The stop diaphragm 7 sets an aperture adapted to a photographing condition. The lens shutter 11 serves as a first shutter for opening and closing the photographing optical path behind the stop diaphragm 7. Note that the above-mentioned photographic lens 6 is, though generally constructed of a plurality of lens units, expressed by only two lens elements with other lens elements being omitted in FIG. 1.

Herein, in this embodiment, the lens shutter 11 is an electro-optical shutter known as a PLZT shutter. The shutter 11 operates with a maximum transmission of light by applying a high voltage to a terminal thereof and closes with a reduced quantity of light transmission by decreasing the voltage.

Further, the stop diaphragm 7 may be replaced by, e.g., a generally known electromagnetic stop.

A film running path for a film F is so formed in a face-to-face relationship with the photographing optical path as to be closer to a rear surface within the camera body 1. Then, a typical focal plane shutter 12 serving as a second shutter is provided in the vicinity of the front of the film F.

Note that a variety of mechanisms (not shown) for winding up and rewinding the film F are incorporated into the camera body 1, and other necessary mechanism and parts are provided with no specific explanation thereof.

The numeral 20 denotes a sequence control circuit, provided in the camera body 1, for controlling a variety of photographing operations of the camera. This sequence control circuit 20 is connected to a lens shutter 11 as the first shutter, the focal plane shutter 12 as the second shutter and the stop diaphragm 7 and is constructed to perform the shutter closing/opening control and the stop control as well.

Herein, a mode setting selector designated at 13 in the Figure is provided on an upper part of the camera body 1. The following is an explanation of how the selector 13 controls the shutter operations of the lens shutter 11 and the focal plane shutter 12 by use of the sequence control circuit 20 in combination with an operation of a mode detecting circuit 12 while setting a selector lever thereof to [M], [E] and [A] as shown in FIG. 2.

When the mode setting selector 13 is set to [M], the sequence control circuit 20 operates to determine an exposure time on a film surface by use of the focal plane shutter 12. Further, when set to [E], the sequence control circuit 20 operates to determine the exposure time by use of the lens shutter 11. Moreover, when set to [A], the sequence control circuit 20 determines the exposure time by use of one of the lens shutter 11 and the focal plane shutter 12 in accordance with a shutter speed or automatically performs a switching operation.

A manual shutter dial 15 functions as a shutter speed setting portion provided with some part being exposed on the rear side of the camera body 1 and is constructed so that the shutter speed of the camera can be set to an arbitrary value through an input of a manual rotary operation thereof. The shutter speed set-inputted by the manual rotation of the shutter dial 15 is inputted via a shutter speed detection circuit 16 to the sequence control circuit 20.

Herein, such a shutter setting portion may employ an output of a very general auto-exposure circuit. More specifically, when the shutter speed is determined by the auto-exposure circuit, an output thereof may be inputted as a shutter speed directly to the sequence control circuit 20 without using the above-mentioned shutter speed detection circuit 16.

The numeral 21 represents a flash signal selection circuit, of the flash device 3, connected to the sequence control circuit 20 for controlling the lens shutter 11, the focal plane shutter 12 as described above. This selection circuit 21 confirms a photographing state of the camera from a combination of the opening/closing states of the respective shutters 11 and 12 and functions to control flashing by the flash device 3 in synchronization with the opening/closing operation of the shutter 11 or 12 on the part of substantially performing an exposure on the film surface.

Note that an output terminal, designated at 12a in FIG. 2, of the focal plane shutter 12, is connected to the flash signal selection circuit 21 and serves for a transfer of a flash signal generated with the opening and closing of the shutter. Further, an output terminal designated at 20a in the Figure serves for a transfer of the flash signal generated with the opening and closing of the lens shutter 11 provided in the sequence control circuit 20 to the flash device 3 via the flash signal selection circuit 21.

Further, the flash signal selection circuit 21 flashes a discharge tube 17 of the flash device 3 by use of a flash circuit 18 in accordance with a setting condition such as the photographing mode for setting the shutter opening/closing control of the lens shutter 11 and the focal plane shutter 12 of the lens barrel 2.

Herein, a flash signal terminal represented by 22 in the Figure is provided in the accessory shoe 4 of the camera body 1, and the numeral 23 denotes a terminal contracting this flash signal terminal 22 when the flash device 3 is mounted. The flash device 3 connected to the camera body via the above-mentioned terminals 22, 23 and flashes upon discharging of the discharge tube 17 through the flash circuit 18 in response to the flash signal.

The following is an explanation of a way of photographing in the mode using the focal plane shutter 12 define d as the second shutter in the thus constructed camera.

When the mode setting selector 13 on the camera body 1 is set to [M] among the characters shown in FIG. 2, the sequence control circuit 20 operates to determine a film exposure time by using the focal plane shutter 12 with a function of the mode detection circuit 14.

To describe it in detail, when a release button (not shown) on the camera body 1 is half-pushed to turn ON a half-push switch (not shown), the sequence control circuit 20 brings the lens shutter 11 as the first shutter into a full-open state.

Next, the release button is fully pushed by further depressing it, and the release switch (not shown) is turned ON, whereby the sequence control circuit 20 adjusts the stop diaphragm 7 to obtain a desired stop diameter (aperture). Herein, as another sequence may involve fully opening the lens shutter 11 after being released and adjusting the stop diaphragm 7.

Further, the sequence control circuit 20 opens the focal plane shutter 12 as the second shutter. Then, when the focal plane shutter 12 is fully opened, a known X-contact is switched ON, and a signal thereof is transmitted to the flash signal selection circuit 21 from the output terminal 12a.

That is, the sequence control circuit 20 makes the flash signal selection circuit 21 select the second shutter in a second shutter employing mode, and hence the X-contact ON signal is transmitted from the focal plane shutter 12 to the flash signal selection circuit 21 and further transmitted from the same circuit 21 to the flash signal terminal 22 on the camera body 1.

Subsequently, in the case of the flash device 3 being mounted in the camera body 1 as illustrated in FIG. 2, an energy is supplied to the discharge tube 17 from the flash circuit 18 in response to the flash signal transmitted via the terminal 23, with the result that the discharge tube 17 flashes.

At this time, since both of the above-mentioned first and second shutters (the lens shutter 11 and the focal plane shutter 12) have already been opened, the film surface is exposed to the light. Simultaneously, the flash photographing can be executed synchronized with the second shutter (the focal plane shutter 12).

Next, the focal plane shutter 12 as the second shutter is closed. A closing timing thereof is, however, controlled to a desired shutter speed inputted to the sequence control circuit 20 via the shutter speed detection circuit 16 by manipulating the shutter setting dial 15 on the camera body 1. Note that an item of shutter speed data of the exposure control circuit (not shown) may be inputted to the sequence control circuit 20 in place of the shutter speed detection circuit 16 if the above shutter speed is determined by a general auto-exposure circuit.

Thereafter, operations required for the next photographing, e.g., a film feed and an accumulation of the flash energy of the flash device 3, are to be carried out, and the camera reverts to the initial state.

Further, the following is an explanation of the manner of photographing in a mode employing the lens shutter 11 defined as the first shutter in the above-mentioned camera.

When the mode setting selector 13 on the camera body 1 is set to [E] among the character symbols shown in FIG. 2, the sequence control circuit 20 operates to determine the exposure time by use of the lens shutter 11 with a function of the mode detection circuit 14.

To describe it in detail, when the release button (not shown) on the camera body 1 is half-pushed to turn ON the half-push switch (not shown), all the circuits within the camera are brought into a ready-for-operation status.

Next, the release button is further pushed, and the release button (not shown) is turned ON, whereby the sequence control circuit 20 adjusts the stop diaphragm 7 to obtain a desired stop diameter (aperture).

Moreover, the sequence control circuit 20 opens the focal plane shutter 12 as the second shutter. Then, when the focal plane shutter 12 is fully opened, the normal X-contact is switched ON, and the signal thereof is transmitted to the flash signal selection circuit 21.

At this time, the sequence control circuit 20 makes the flash signal selection circuit 21 select the first shutter in this first shutter employing mode, and therefore the X-contact ON signal is neither used nor transmitted to the flash signal terminal 22 on the camera body 1.

Next, the sequence control circuit 20 opens the lens shutter 11 by applying a high voltage as described herein above. Then, in accordance with this embodiment, the flash signal is outputted from the sequence control circuit 20 via the output terminal 20a at around an end of this opening operation. This flash signal is transmitted to the flash signal selection circuit 21. The sequence control circuit 20 makes the flash signal selection circuit 21 select the first shutter in the first shutter employing mode, and the flash signal is transmitted from this control circuit 20 to the flash signal terminal 22 on the camera body 1. Hereupon, the flash signal is transmitted via the terminal 23 of the flash device 3, and the energy is supplied from the flash circuit 18, whereby the discharge tube 17 flashes.

Herein, if the first shutter is, e.g., a mechanical type or electronic type lens shutter that have hitherto been generally known, the X-contact ON signal is transmitted to the flash signal selection circuit 21, thereby obtaining the same effect. Further, a system of opening and closing the first shutter during the flashing by starting flashing the flash device first, can be considered. In this case, there may be provided for emitting the flash signal immediately before the shutter starts opening.

Moreover, when the above-mentioned discharge tube 17 flashes, since both of the first and second shutters (the lens shutter 11 and the focal plane shutter 12) have already been opened, the film surface is exposed to the light. Simultaneously, flash photographing can be executed synchronized with the first shutter (the lens shutter 11).

Next, the lens shutter 11 as the first shutter is closed. A closing timing thereof is, however, controlled to a desired shutter speed inputted to the sequence control circuit 20 via the shutter speed detection circuit 16 by manipulating the shutter setting dial 15 on the camera body 1. Note that the shutter speed data of the exposure control circuit (not shown) may be, as stated above, inputted to the sequence control circuit 20 in place of the shutter speed detection circuit 16 if the above shutter speed is determined by the general auto-exposure circuit.

Thereafter, the operations required for the next photographing, e.g., the film feed and the accumulation of the flash energy of the flash device 3, are to be carried out, and the camera reverts to the initial state in the same way with the above-mentioned second shutter employing mode.

Further, the following is an explanation of the manner of photographing in an auto-setting mode of automatically selecting the use of the first and second shutters (the lens shutter 11 and the focal plane shutter 12).

When the mode setting selector 13 on the camera body 1 is set to [A] among the character symbols shown in FIG. 2, the sequence control circuit 20 automatically performs a switching operation to determine the exposure time by use of the first shutter (the lens shutter 11) or the second shutter (the focal plane shutter 12) with a function of the mode detection circuit 14, depending on the shutter speed.

To describe it in detail, when the release button (not shown) on the camera body 1 is half-pushed to turn ON the half-push switch (not shown), all the circuits within the camera are brought into the ready-for-operation status. At this time, if the shutter speed inputted to the sequence control circuit 20 is determined via the shutter speed detection circuit 16 by manipulating the shutter setting dial 15 or determined by a known auto-exposure circuit, and if there is a high shutter speed outputted by the unillustrated exposure control circuit which is to be inputted to the sequence control circuit 20 in place of the speed detection circuit, the sequence control circuit 20 determines the film exposure time by employing the lens shutter 11 serving as the first shutter.

Note that when further pushing the release button (full-push operation) thereafter to turn ON the release switch (not shown), the operation is the same as the first shutter employing mode described above, and therefore the explanation of the operation thereof is omitted.

On the other hand, if the shutter speed inputted to the sequence control circuit 20 is determined via the shutter speed detection circuit 16 by manipulating the shutter setting dial 15 or determined by the known auto-exposure circuit, and if there is a low shutter speed outputted by the unillustrated exposure control circuit which is to be inputted to the sequence control circuit 20 in place of the speed detection circuit, the sequence control circuit 20 operates to determine the film exposure time by employing the focal plane shutter 12 serving as the second shutter.

Note that when further pushing the release button (full-push operation) thereafter to turn ON the release switch (not shown), the operation is the same as the second shutter employing mode described above, and hence the explanation of the operation thereof is omitted.

Herein, as in the present embodiment, the first shutter involves the use of the lens shutter 11 constructed of a PLZT shutter as taken in this embodiment, while the second shutter involves the use of a blade type focal plane shutter 12. In this case, the high shutter speed may be set to, e.g., 1/64000 through 1/250 sec., while the low shutter speed may be set to less than 1/250 sec.—long time exposure.

Note that the mode detection circuit 14 may, as is obvious from the circuit block diagram of FIG. 2, involve the use of, e.g., a 2-bit brush contact type encoder according to the camera in this embodiment. Further, the shutter speed detection circuit 16 may involve the use of a rotary resistor to obtain an A/D converted digital signal.

According to the thus constructed camera capable of flash photographing, the flash device 3 is attached to the camera body 1, and the camera is provided with the first shutter 11 disposed within the lens units constituting, e.g., the photographic lens 6 or disposed in the vicinity of the rear portion of the photographic lens 6 and the second shutter 12 disposed in the vicinity of the front portion of the film F. Moreover, the camera is provided with the sequence control circuit 20 serving as a control unit, i.e., as a photography selection portion constructed of a first photographing portion for performing the exposure onto the film surface by opening and closing the first shutter 11 in a state where the second shutter 12 is opened, and a second photographing portion for performing the exposure onto the film surface by opening and closing the second shutter 12 in a state where the first shutter 11 is opened, wherein the photography selection portion operates to select one of those photographing portions. The camera is also provided with the flash control portions 21 and 18 for controlling the flash device 3.

Then, the flash control portions 21 and 18, when the first photographing portion is selected, controls the flash device 3 in synchronization with the first shutter 11 and, when the second photographing portion is selected, controls the flash device 3 in synchronization with the second shutter 12.

Based on such a construction, when effecting flash photographing, the flash signal synchronized with the opening of the shutter for substantially determining the exposure time is automatically selected and generated. Accordingly, if the flash device is once connected to the accessory shoe or the synchro terminal as a connected portion of the camera body 1, the flash photographing can be performed with neither mistake nor much labor.

Further, the thus constructed camera capable of flash photographing is provided with an auto-exposure control device as well as a manual shutter setting dial 15 as the shutter speed setting portion for setting the shutter speed. The sequence control circuit 20 serving as the photography selection portion is so constructed as to be capable of selecting the first and second photographing portions in accordance with the shutter speed set by the shutter speed setting portion.

Herein, the sequence control circuit 20 defined as the photography selection portion may be constructed to select the first photographing portion when the dial 15 for setting the shutter speed sets a high shutter speed and the second photographing portion when the shutter speed setting portion sets a low shutter speed.

According to such a construction, there is provided the function of automatically selecting the mode when the two shutters 11 and 12 are operated in combination in accordance with the shutter speed set based on a set value of the manual shutter dial as well as by the output of the auto-exposure control device that are defined as the shutter speed setting portion. It is therefore possible to perform the flash photographing more easily.

It is to be noted that the present invention is not limited to the structure of the embodiment discussed, as a matter of course, the configurations and structures of the respective portions of the camera can be properly modified and changed, and a variety of modifications can be contrived. For instance, the lens shutter 11 serving as the first shutter may be disposed not inside the optical system constituting the photographic lens but in the vicinity of the rear portion of the photographic lens 6.

Figure 3:
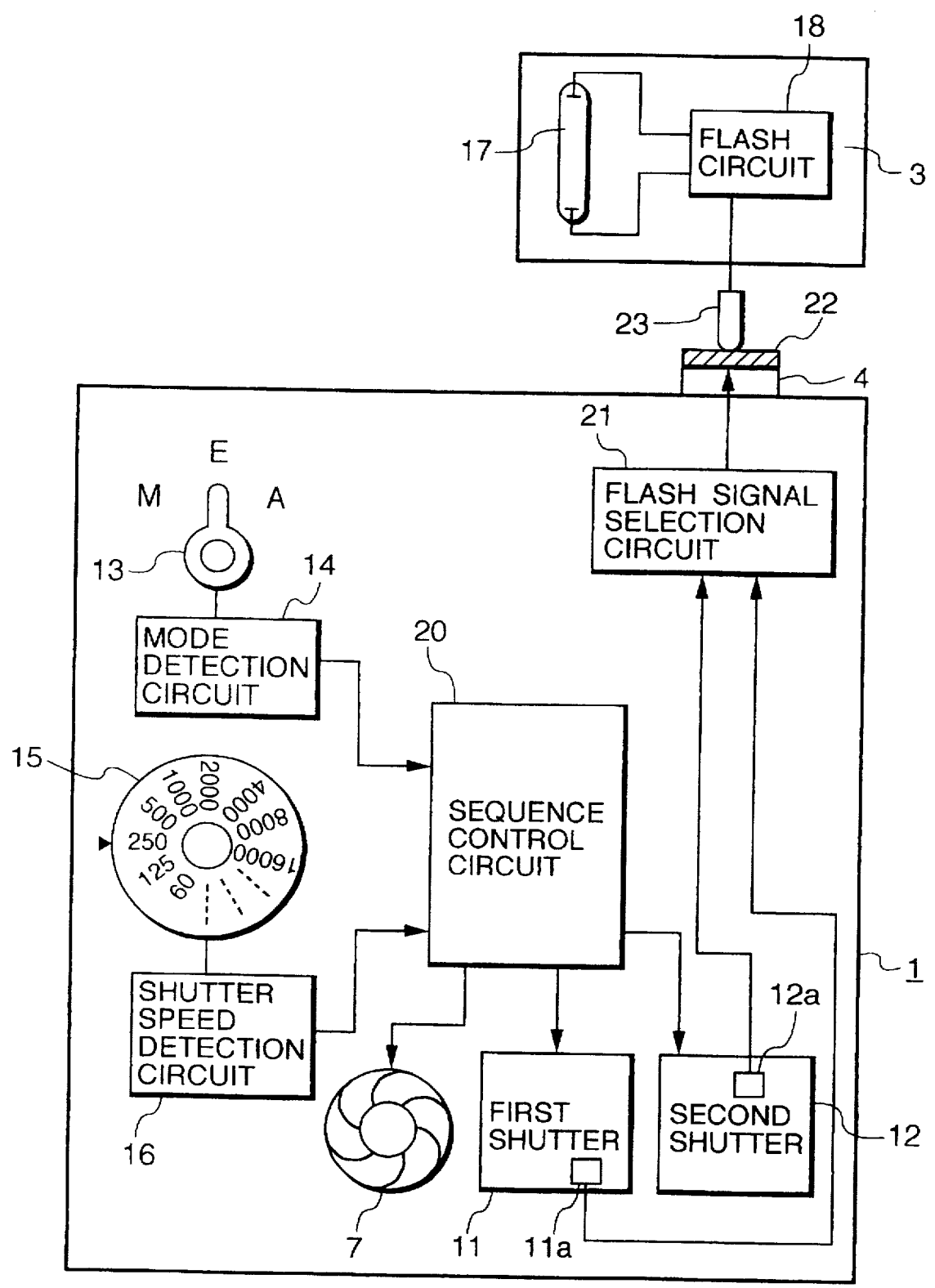
FIG. 3 is a circuit block diagram of the whole camera, illustrating another embodiment of the control device for the camera capable of flash photographing according to the present invention.

Further, in the embodiment discussed above, as shown in FIG. 3, the flash signal for the lens shutter 11 as the first shutter is generated within the sequence control circuit 20 and transmitted to the flash signal selection circuit 21 via the output terminal 20a. In this connection, if capable of generating the flash signal upon opening the shutter by use of the typical lens shutter 11 as the first shutter, this signal is transmitted directly to the flash signal selection circuit 21 from the output terminal 11a.

According to this construction, the camera designed to select the flash signals of the two shutters (the lens shutter 11 and the focal plane shutter 12) exhibits an advantage of being simple in terms of the configuration, although there are a good number of parts.

The control device of the camera capable of performing the flash photographing according to the present invention, as discussed above, includes the flash device, the first shutter capable of guiding the light flux from the object after passing through the photographic lens onto the film surface with the opening/closing operations, and the second shutter for guiding the light flux passing through the first shutter with the opening/closing operations. Provided also are the first photographing portion for exposing the film surface by opening and closing the first shutter in the state where the second shutter is opened, and the second photographing portion for exposing the film surface by opening and closing the second shutter in the state where the first shutter is opened. Provided further are the photography selection portion operating to select one of the first and second photographing portions, and the flash control circuit for controlling the flash device when performing the flash photographing. This flash control circuit is so constructed as to be capable of controlling the flash device in synchronization with the first shutter when the first photographing portion is selected and in synchronization with the second shutter when the second photographing portion is selected. The configuration is therefore simple, and nevertheless the following excellent effects are exhibited.

According to the present invention, when the flash device executes the flash photographing synchronized with the opening/closing operations of the first or second shutter for opening and closing the same photographing optical path, the photography selection portion and the exposure control portion automatically control the flash device in synchronization with the opening/closing operations of the shutter, thus performing flash photographing. Hence, unlike the prior art, there is no necessity for the operation of reconnecting the flash device with the connecting portion to each shutter on the side of the camera in accordance with the selection by the first and second photographing portions by the photography selection portion. Further, the flash photographing exploiting the characteristics of the two shutters and the flash device can be carried out in the desired state with neither the mistake nor much labor in automatic synchronization with the opening/closing operations of the shutters. It is also possible to prevent a failure in flash photographing as seen in the prior art.

Moreover, according to the present invention, there is provided the shutter speed setting device for setting by the manual shutter dial as well as by the output of the autoexposure control device, and the photography selection portion is so constructed to select the first and second photographing portions in accordance with the shutter speed set by the shutter speed setting device. It is therefore feasible for the photography selection portion to automatically properly select the first or second photographing portion and for the flash control unit to automatically properly control the flash device, corresponding to the selection thereof. Advantages are thereby produced, wherein the operations during flash photographing can be further saved, and flash photographing employing the flash device can be implemented in the desired state more conveniently.

Further, according to the present invention, the first shutter is disposed between the lens elements constituting the photographic lens or in the vicinity of the rear portion thereof, while the second shutter is disposed in proximity to the front portion of the film. Also, the control circuit is so constructed to select the first photographing portion when the shutter speed setting portion sets the high shutter speed and the second photographing portion when the shutter speed setting portion sets the low shutter speed. The above-mentioned advantages and effects can be therefore exhibited.

It is apparent that, in this invention, a wide range of different working modes can be formed based on the invention without deviating from the spirit and scope of the invention. This invention is not restricted by its specific working modes except being limited by the appended claims.

What is claimed is:

1. A control device for a camera capable of using a flash device and provided with a first shutter, being a physical property shutter, capable of selectively guiding a light flux from an object onto a film surface through a photographic lens and a second shutter for selectively guiding the light flux passing through said first shutter onto the film surface, said control device comprising:

a control circuit including a first photographic program for exposing the film surface to the light flux by making said first shutter open to the light flux in a state where said second shutter is fully opened to the light flux and a second photographing program for exposing the film surface to the light flux by making said second shutter open to the light flux in a state where said first shutter is fully opened to the light flux, said control circuit selectively executing one of said first photographing program and said second photographing program, and producing a light signal in synchronization with said first shutter, said control circuit producing a timing signal to synchronize the flashing with the first shutter; and a flash control circuit for controlling, in conformance with said light signal, said flash device when performing flash photographing, said flash control circuit controlling said flash device in synchronization with said first shutter when said first photographing program is selected and controlling said flash device in synchronization with said second shutter when said second photographing program is selected.

2. The control device for the camera capable of the flash photographing according to claim 1, further comprising:

a shutter speed setting device to set a shutter speed, wherein said control circuit selects said first photographing portion and said second photographing portion in accordance with the shutter speed set by said shutter speed setting device.

3. The control device for the camera capable of flash photographing according to claim 1, wherein said first shutter is disposed either between lens elements constituting said photographic lens or in the vicinity of a rear portion of said photographic lens, and said second shutter is disposed in the vicinity of a front portion of the film surface.

4. The control device for the camera capable of flash photographing according to claim 2, wherein said control circuit selects said first photographing program when said shutter speed setting portion sets a shutter speed higher than a predetermined shutter speed and said second photographing program when said shutter speed setting portion sets a shutter speed lower than the predetermined shutter speed.

5. A camera system capable of the flash photographing, comprising:

a first shutter to selectively guide a light flux from an object onto a film surface through a photographic lens;

a second shutter to selectively guide the light flux passing through said first shutter onto the film surface;

a flash device to illuminate an object with a light flux when the flash photographing is performed;

a control circuit to selectively work a first photographing mode of exposing the film surface to the light flux by making said first shutter open to the light flux in a state where said second shutter is opened to the light flux, and a second photographing mode of exposing the film surface to the light flux by making said second shutter open to the light flux in a state where said first shutter is opened to the light flux, said control circuit producing a timing signal to synchronize the flashing with the first shutter;

a flash control circuit to control said flash device when performing flash photographing, said flash control circuit controlling said flash device in synchronization with said first shutter when the first photographing mode is selected and controlling said flash device in synchronization with said second shutter when the second photographing mode is selected; and a shutter speed setting device to set a shutter speed, wherein said control circuit selects one of the first photographing mode and the second photographing mode in accordance with the shutter speed set by said shutter speed setting device.

* * * * *